(12) United States Patent
Ngo et al.

(10) Patent No.: US 7,797,502 B2
(45) Date of Patent: Sep. 14, 2010

(54) METHOD TO CONTROL THE ACCESS IN A FLASH MEMORY AND SYSTEM FOR THE IMPLEMENTATION OF SUCH A METHOD

(75) Inventors: Van Tai Ngo, Louveciennes (FR); Alain Boudou, Louveciennes (FR); Laurent Castillo, Louveciennes (FR)

(73) Assignee: Axalto S.A., Meudon Cedex (FR)

( * ) Notice: Subject to any disclaimer, the term of this patent is extended or adjusted under 35 U.S.C. 154(b) by 718 days.

(21) Appl. No.: 10/581,130

(22) PCT Filed: Dec. 1, 2004

(86) PCT No.: PCT/IB2004/003976

§ 371 (c)(1),
(2), (4) Date: May 31, 2006

(87) PCT Pub. No.: WO2005/055019

PCT Pub. Date: Jun. 16, 2005

(65) Prior Publication Data

US 2007/0118680 A1 May 24, 2007

(30) Foreign Application Priority Data

Dec. 2, 2003 (EP) .................................. 03293002

(51) Int. Cl.
*G06F 12/00* (2006.01)
*G06F 13/00* (2006.01)
*G06F 13/28* (2006.01)

(52) U.S. Cl. ...................................... 711/163; 711/103

(58) Field of Classification Search .................. 711/103, 711/163
See application file for complete search history.

(56) References Cited

U.S. PATENT DOCUMENTS

| | | | | | |
|---|---|---|---|---|---|
| 4,177,510 | A | * | 12/1979 | Appell et al. | 711/163 |
| 5,678,027 | A | * | 10/1997 | Pockrandt et al. | 711/163 |
| 5,974,500 | A | * | 10/1999 | Maletsky et al. | 711/103 |
| 6,154,819 | A | * | 11/2000 | Larsen et al. | 711/163 |
| 6,401,160 | B1 | * | 6/2002 | See et al. | 711/5 |
| 6,446,179 | B2 | * | 9/2002 | Baltar | 711/163 |
| 7,177,975 | B2 | * | 2/2007 | Toombs et al. | 711/103 |
| 2002/0002654 | A1 | | 1/2002 | Tomohiro | |
| 2003/0196028 | A1 | * | 10/2003 | Maeda et al. | 711/103 |

OTHER PUBLICATIONS

International Search Report for PCT/IB2004/003976 dated Feb. 15, 2005 (2 pages).

* cited by examiner

*Primary Examiner*—Stephen Elmore
*Assistant Examiner*—Mark A Giardino, Jr.
(74) *Attorney, Agent, or Firm*—Osha • Liang LLP

(57) ABSTRACT

A method to control access to a sector of a flash type memory of an electronic module. The method includes receiving a write request to write data to an area of a partition, wherein the partition is located within the sector and, prior to writing to the data, determining whether an owner of the data to be written has write access to the partition of the sector and permission to erase the entire sector in which the partition is located.

12 Claims, 2 Drawing Sheets

METHOD TO CONTROL THE ACCESS IN A FLASH MEMORY AND SYSTEM FOR THE IMPLEMENTATION OF SUCH A METHOD

CROSS REFERENCE TO RELATED APPLICATION

This application claims the benefit, pursuant to 35 U.S.C. §119, of Patent Cooperation Treaty Application No. PCT/IB2004/003976 filed on Dec. 1, 2004, which claims priority of European Patent Application No. 03293002.6 filed Dec. 2, 2003.

FIELD OF THE INVENTION

This invention concerns a method to control the access in a flash memory of an electronic module and the module for the implementation of such a method.

The invention applies according to a special form of realisation, to a portable object such as an integrated circuit card. The integrated circuit cards may be for example memory cards or microprocessor cards.

In the context of the invention, the term "portable object" must be taken in its broadest sense. It concerns in particular all types of light terminals equipped with an electronic chip and more especially the smart cards as such. The electronic chip is itself equipped with information processing means (for example a microprocessor) and information storage means.

BACKGROUND

Currently, a new non volatile memory technology is emerging in smart cards: Flash technology. The Flash memory is organised in sectors as shown on FIG. 1 (sectors 1, 2 and 3). Each sector is a memory block of unique size. The memory space of each sector is divided into memory pages, for example of 128 bytes, grouped into partitions or segments (e.g.: partition Appli1, partition Appli2, partition Appli3 and partition OS of sector 1 on FIG. 1), used to store various software modules (Appli1, Appli2, Appli3, OS). A partition contains all pages of a sector allocated to a given owner.

In the multi-application cards, several applications may share the same sector (for example, applications 1, 2 and 3 share sector 1 on FIG. 1).

The access controllers of known type provide a given application with write access to a sector it owns or shares. In the Flash memory, a sector defines the unit of erasable memory: consequently to modify a non-blank area of the sector, for example a partition, the entire sector must be erased. To write in a non-blank area of a sector, the entire sector is erased: a sector forms an indivisible unit for erasure. As shown on FIG. 1 therefore, if application 1 wants to modify sector 1, it could erase the data of application 2 or even of the operating system. When erasing before writing, partitions containing data belonging to other applications could suffer irrevocable damage.

One known solution is to allocate an entire sector to a single owner. When the sector is large, however, there is a significant loss of memory space and poor flexibility.

One objective of this invention is to optimise the write operation in a Flash memory.

SUMMARY OF THE INVENTION

This invention concerns a method to control the access to a sector of a flash type memory of an electronic module which consists in checking that the owner of the data to be written has write access to a partition of said sector characterised in that it consists in checking at least one additional rule on the sector concerned in order to allow possible erasure of the entire said sector before writing in it.

This invention also concerns the electronic module including information processing means, a FLASH type non volatile memory characterised in that it includes a memory manager which consists in checking on the sector concerned at least one rule in addition to that which consists in checking that the owner of the data to be written has write access to a partition of said sector, in order to authorize possible erasure of the entire said sector before writing in it.

BRIEF DESCRIPTION OF THE DRAWINGS

Other purposes, features and advantages of the invention will appear on reading the description which follows of the implementation of the method according to the invention and of a mode of realisation of an electronic system designed for this implementation, given as a non-limiting example, and referring to the attached drawings in which.

DETAILED DESCRIPTION

Figure 1:
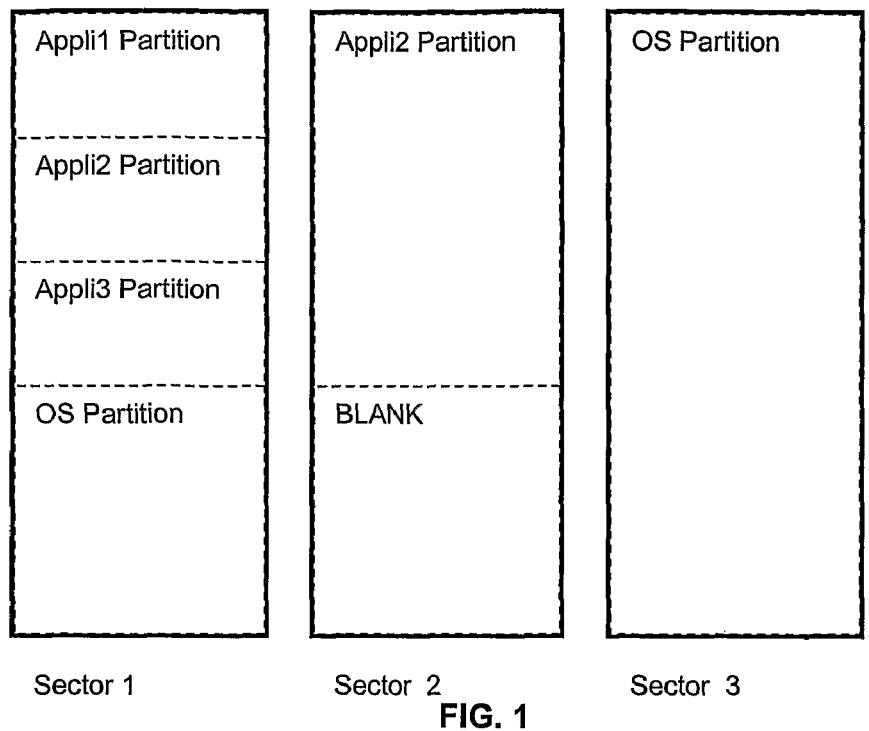
FIG. 1 is a diagrammatic representation of the organisation of a Flash memory.
Figure 2:
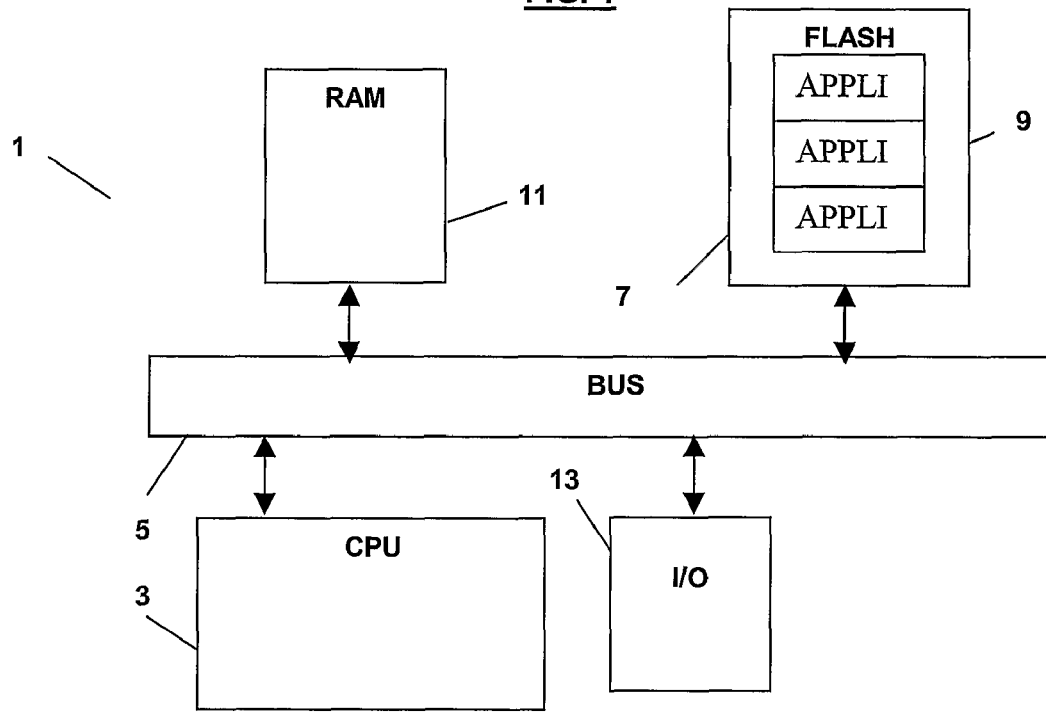
FIG. 2 is a diagrammatic representation of a non-limiting mode of realisation of an electronic unit with microprocessor designed to use the method according to the invention.

The method according to the invention aims to optimise the write in a Flash memory of an electronic system such as for example any portable object equipped with an electronic module and more especially an integrated circuit card. The electronic system comprises at least a processor and a Flash type non volatile memory. In the following description, FLASH type memory means any memory organised in sectors, the sector forming an indivisible unit for erasure, the sector being itself subdivided into memory pages which could be allocated to different owners.

As a non-limiting example, the electronic system described below corresponds to a portable object comprising an electronic module 1 illustrated on FIG. 1. This type of module is generally realised as a monolithic integrated electronic microcircuit, or chip, which once physically protected by any known means can be assembled on a portable object such as for example a smart card, integrated circuit card or other card which can be used in various fields.

The microprocessor electronic module 1 comprises a microprocessor CPU 3 with a two-way connection via an internal bus 5 to a Flash type non volatile memory 7 containing applications 9, appli1, appli2, appli3, to be executed, a volatile memory 11 of type RAM, input/output means I/O 13 to communicate with the exterior.

Figure 3:
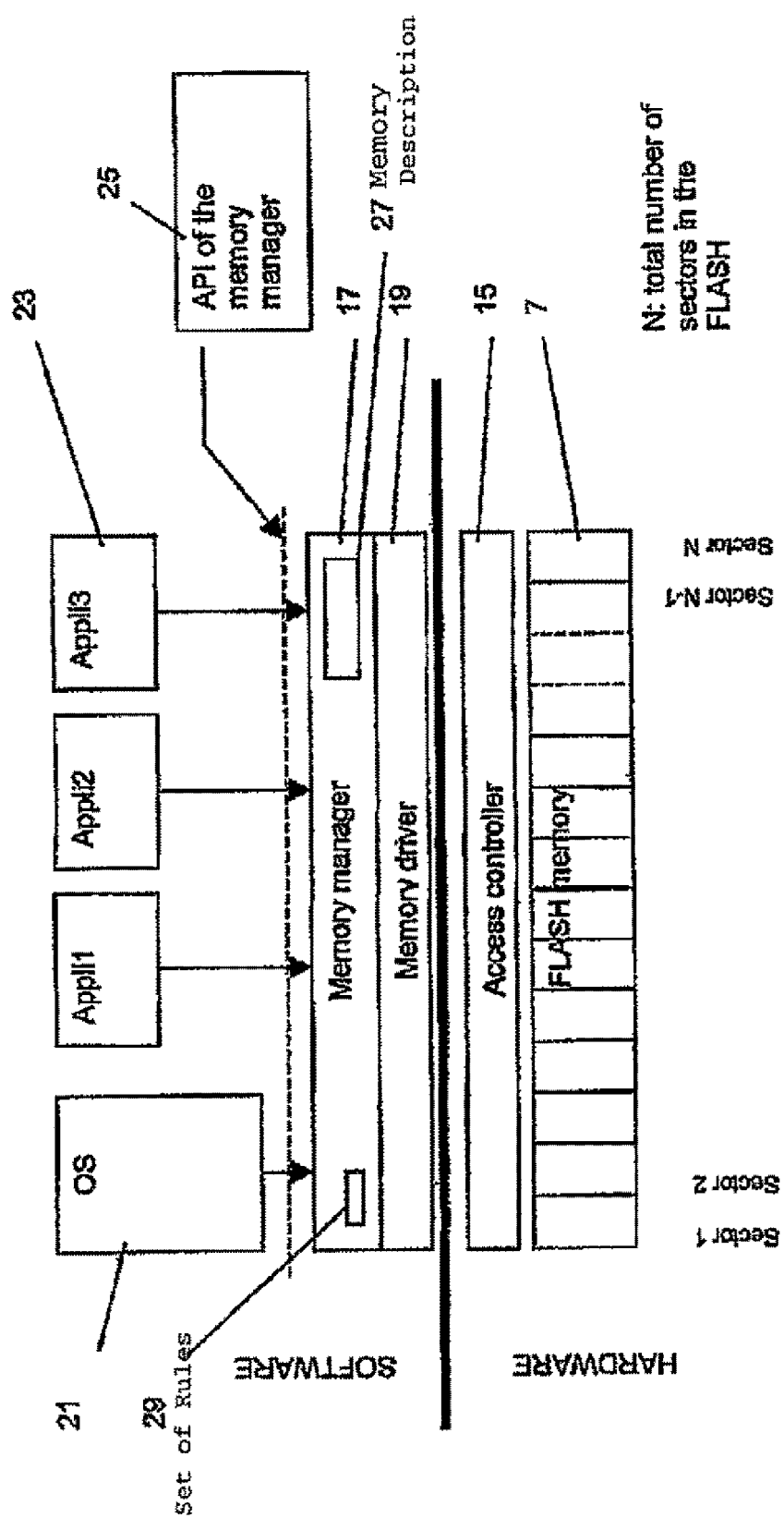
FIG. 3 is a diagrammatic representation of the various software and hardware layers of the access control system according to this invention.

As represented on FIG. 3, from the hardware layer consisting of the Flash memory 7 and an access controller 15 controlling access to the memory 7, we can identify a software layer comprising a memory manager 17 associated or not with a pilot 19 and a software layer comprising resident applications 21 for example a program of the operating system and "user" applications 23 corresponding to precise features (for example an integrated circuit card: bank card, health card, identity card). This representation provides a diagrammatic illustration of the memory access control system only, bearing in mind that the hardware and software layers comprise many other modules performing various tasks.

The access controller 15 checks that a user wanting to access an address in the memory has the necessary rights. Generally, the access controller 15 can be realised as windows open on a series of pages (such as a segmentation device MPU) or as semi-static access matrices associating attributes to the pages (partition type device MAC). Applications are associated with memory areas either during configuration or when selecting an application. Such mechanisms only allow memory access for predetermined code/data area pairs. With an access matrix, for example, the role of the access controller at the time of execution simply consists in comparing the identity of the page "owner" and the identity of the module trying to access this page.

According to this invention, the memory manager 17 intercepts the writes in Flash memory 7 and performs an additional check on the sector concerned before authorizing or not erasure of the sector following the write. The check determines whether the erasure caused by the write would not delete data belonging to other owners. In this description, the term "data" covers any type of information stored in the memory, whether code, data or other. Writes must never be made directly in memory nor by direct call to a pilot, but be made via said memory manager. The manager can also check the write access rights in the page indicated.

The method according to the invention consists, using the memory manager, in checking a set of rules for the entire sector concerned, to authorize the erasure of a sector before writing in it.

The set of rules concerning the sector takes into consideration the owner(s) of the pages in the segment concerned and the content of the pages. The set of rules checks that the write cannot delete data which must be kept and in particular data of an owner other than the user wanting to make the write.

The check is therefore based on one or more rules of the following type:
The write is authorized if:
the location in the sector where the write is to be made is blank, bearing in mind that the sector is not necessarily completely blank; the write does not result in erasure;
And/or the entire sector belongs to the same owner;
a And/or the pages not belonging to the same owner are blank;
And/or the pages not belonging to the same owner are marked as erasable;
In this description, a sector is said to be blank when no write has been made in the sector or when the sector has been erased and no new write has been made since the erasure.

According to a special form of realisation of the invention, the module according to this invention comprises all of these rules.

The manager has:
a memory description 27 stored in memory:
a number of sectors
a number of pages per sector
an owner of each page
the statuses of the pages (erasable, blank or not blank)
a description of the current request:
the sector concerned (from the address)
the owner issuing the request
and a set of rules 29.

The memory manager allows an owner to mark the pages belonging to him as erasable. As seen previously, the manager keeps the statuses of the pages marked as erasable in the description 27.

In addition, the memory manager must respect the following conditions:
The check code must be executed with the privileges required to authorize or not the erasure of a sector;
All memory accesses must be made via this manager;
It must not be possible for the code to be changed by the code of another unauthorized owner.

A simple application program interface (API) 25 based on the previous constraints could include, for example, the following functions:
error nv_write(dst_addr, src_addr, length):
dst_addr: destination address Where the data will be written
src_addr: source address from which the data to be written will be read
length: length of the data to be written.
This function is used to write in memory the data read at a given address after checking the set of rules.
error nv_fill(dst_addr, pattern, length):
a dst_addr: destination address from which the memory will be filled with the required pattern
pattern: byte to be reproduced
length: length of the area to be filled
This function is used to write in memory the data of a "pattern" after checking the set of rules.

In the example illustrated on FIG. 1, if the applications and the operating system do not authorize any modification or any erasure by a third party:
In sector 1, the manager will not authorize any applications nor the operating system to erase the sector since the sector is divided into 4 partitions belonging to different owners and no owner authorizes his neighbour to modify his own partition. The sector can only be erased if the 4 partitions are marked by their owners as erasable.
For sector 2, the manager will authorize application No. 2 to erase its own partition since the rest of the sector is blank;
For sector 3, since the sector belongs entirely to the operating system, the operating system has all the rights on this sector. It can therefore erase it.

What is claimed is:

1. A method to control access to a sector of a flash type memory of an electronic module comprising:
receiving a write request to write data to an area of a partition, wherein the partition is located within the sector; and
making a first determination about whether an owner of the data to be written has write access to the partition of the sector, and
making a second determination about whether the owner has permission to erase the entire sector in which the partition is located using a rule, wherein the rule verifies that the write request does not delete data of an owner other than the owner issuing the write request; and
writing the data to the partition when the first determination and the second determination allow the write request to proceed.

2. The method of claim 1, wherein the owner is granted permission to erase the entire sector if at least one of the following conditions is satisfied: the entire sector belongs to the owner, remaining partitions in the sector not belonging to the owner are blank, and the remaining partitions in the sector not belonging to the owner are marked as erasable.

3. The method of claim 1, wherein the partition is associated with a status, wherein the status is one selected from the group consisting of erasable, blank, and not blank.

4. An electronic module comprising:
a FLASH type non-volatile memory comprising a sector, wherein the sector comprises a partition;
a set of rules, wherein the set of rules is used to determine whether an owner of data is granted permission to erase the entire sector, wherein a rule in the set of rules verifies that the write request does not delete data of an owner other than the owner issuing the write request;
a memory manager, operatively connected to the FLASH type non-volatile memory configured to:
receive a write request to write the data to an area of the partition,
determine whether the owner of the data to be written has write access to the partition and permission to erase the entire sector using the set of rules, and
write the data to the partition when the determination allows the write request to proceed.

5. The electronic module of claim 4, wherein the memory module intercepts all write requests to the FLASH type non-volatile memory.

6. The electronic module of claim 4, wherein the memory manager is configured to access a description of the partition, wherein the description comprises the status of the partition.

7. The electronic module of claim 6, wherein the status is one selected from the group consisting of erasable, blank, and not blank.

8. A card comprising an electronic module according to claim 4.

9. The electronic module of claim 4, wherein the set of rules specifies that the owner is granted permission to erase the entire sector if at least one of the following conditions is satisfied: the entire sector belongs to the owner, remaining partitions in the sector not belonging to the owner are blank, and the remaining partitions in the sector not belonging to the owner are marked as erasable.

10. An electronic assembly including a computer program comprising program code instructions to execute the steps of the method according to claim 1 when the program is executed by the electronic assembly.

11. The electronic assembly of claim 10, wherein the owner is granted permission to erase the entire sector if at least one of the following conditions is satisfied: the entire sector belongs to the owner, remaining partitions in the sector not belonging to the owner are blank, and the remaining partitions in the sector not belonging to the owner are marked as erasable.

12. The electronic assembly of claim 10, wherein the partition is associated with a status, wherein the status is one selected from the group consisting of erasable, blank, and not blank.

* * * * *